United States Patent Office 3,389,251
Patented June 18, 1968

3,389,251
EQUIPMENT FOR MEASURING RADIOACTIVITY
AS DISCHARGED IN THE FORM OF EFFLUENTS
Pierre Raimbault, Boulogne-sur-Seine, Jean Goupil, St.
  Germain-en-Laye, and Yves Marque, Antony, France,
  assignors to Commissariat à l'Energie Atomique, Paris,
  France
Filed June 16, 1964, Ser. No. 375,464
Claims priority, application France, June 24, 1963,
939,191
2 Claims. (Cl. 250—43.5)

The present invention relates to the measurement of radioactivity as discharged in the form of effluents which may previously have been stored in deactivation tanks, which entails high sensitivity of the devices employed.

The monitoring of activity which is stored in a number of tanks for the deactivation of effluents as well as the activity of effluents discharged through a number of conduits which terminate at relatively distant points of a pipeline of large diameter or a watercourse had hitherto been achieved by means of equipment units for measuring radioactivity which were mounted either on each tank or on each conduit, such as those described in the copending French patent application of Dec. 11, 1963, in respect of "Apparatus for Monitoring the Radioactivity of a Liquid" or in French Patent No. 1,280,097, these two specifications having been filed by the present applicant.

In the method referred to, the indications provided by these various measuring devices were noted at specified intervals by an operator, and a subsequent calculation then permitted the determination of the activity which remained stored as well as the total activity discharged over a predetermined period of time either through one of the conduits, a number of conduits or all of the conduits. A monitoring operation of this kind is relatively laborious, particularly if the measuring stations are distributed over a large surface and, as a general rule, any abnormal increase in discharged activity is not automatically indicated.

The present invention proposes a novel equipment unit which provides a remedy for the above-noted disadvantages and is accordingly designed for the purpose of measuring activity which is discharged in the form of effluents through a number of conduits as well as the activity which is stored in the same form in a plurality of tanks.

An equipment unit for measuring activity which is discharged in the form of either liquid or gaseous effluents in accordance with the invention comprises an assembly of $n$ detectors and transmits respectively and in periodic manner a signal which measures the specific activity of effluents which are discharged through a corresponding number of conduits to a computer system designed to calculate the total activity of effluents which have passed through each conduit over a predetermined period of time.

The equipment unit for measuring activity which is discharged in the form of effluents as hereinabove described can form a measuring assembly by association with an equipment unit for measuring the activity which is stored in $m$ tanks in which an assembly of $n$ detectors transmits respectively and in a periodic manner a signal which measures the specific activity of effluents which are stored in a corresponding number of deactivation tanks to a computer system for determining the total activity of effluents stored in each tank over a predetermined period of time.

The measuring unit which has just been referred-to employs only a single computer.

The computer system consists of a first storage device or so-called intermediate storage unit, a scanning device which extracts information from the intermediate storage unit so as to apply said information to a main storage unit which supplies the information to a computer proper and the said computer being adapted to control an output unit such as a data-printing device, the aforesaid computer system being additionally provided with a programming device which controls the different elements of the computer system and detectors.

In the equipment unit for measuring activity which is discharged in the form of effluents, the pulses produced by the $n$ detectors which are designed to measure the instantaneous specific activities of effluents discharged from a corresponding number of conduits are subjected to a coding and scaling process prior to being transmitted by telephone lines.

Finally, in accordance with a preferred form of embodiment of the invention, the main storage unit of the computer system is of the circulating storage type, the essential element of which is a magnetostriction delay line.

Aside from these principal arrangements, the invention is further characterized by certain secondary arrangements which will be mentioned hereinafter and which relate in particular to the design of the computer system employed.

Reference being made to the accompanying diagrammatic figures, there will now be described a complete measuring system in accordance with the invention.

The constructional arrangements which will be described in connection with these examples do not have any limiting character and must be considered as forming part of the invention, it being understood that any and all equivalent arrangements could equally well be employed without thereby departing from the scope of the said invention.

Figure 1:
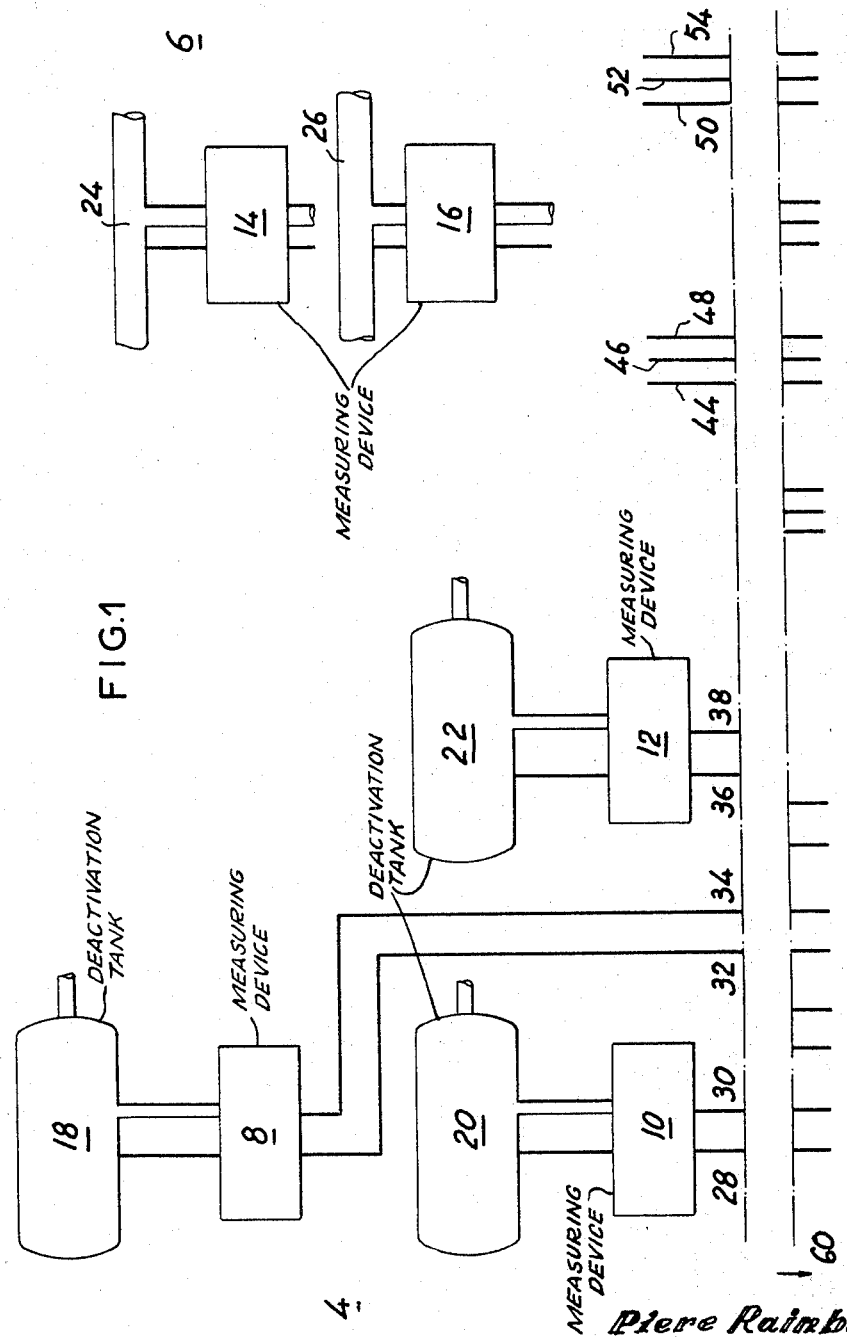
FIG. 1 is a diagram of a system comprising an equipment unit for measuring the activity which is discharged in the form of effluents from a number of conduits and an equipment unit for measuring the acivity which is stored in a plurality of deactivation tanks, only one computer being employed.

The unit 2 of FIG. 1 comprises measuring devices 8, 10 and 12 which are associated with the deactivation tanks 18, 20, 22 which form part of an equipment unit 4 for measuring the activity which is stored in the said effluent tanks over a predetermined period of time and measuring devices 14, 16 . . . which are associated with the conduits 24, 26 . . . for removing the effluents, said conduits forming part of an equipment unit 6 for the measurement of discharged activity.

Each of the devices 8, 10, 12 measures the stored volume in the associated tanks as well as the activity of the effluents which are stored in the same tanks. Finally, the measuring devices 14 and 16 comprise on the one hand a flow meter for the purpose of measuring the flow rate of the fluid which is conveyed through the corresponding conduit over a predetermined period of time and, on the other hand, a detector for measuring the activity of said effluents during the same period. Whereas the measuring devices 8, 10 and 12 are preferably fitted with the device which is described in the co-pending French patent application filed by the present applicant on Dec. 11, 1963, in respect of "Apparatus for Monitoring the Radioactivity of a Liquid," the measuring devices 14 and 16 are fitted with the unit for measuring the radioactivity of water which is described in French Patent No. 1,280,097 as also filed in the name of the present applicant.

The different signals produced by the measuring devices 8, 10, 12, 14, 16, are applied to telephone lines 28, 30, 32, 34, 36, 38, 44, 46, 48, 50, 52, 54, which transmit said signals to a single computer 60.

Figure 2:
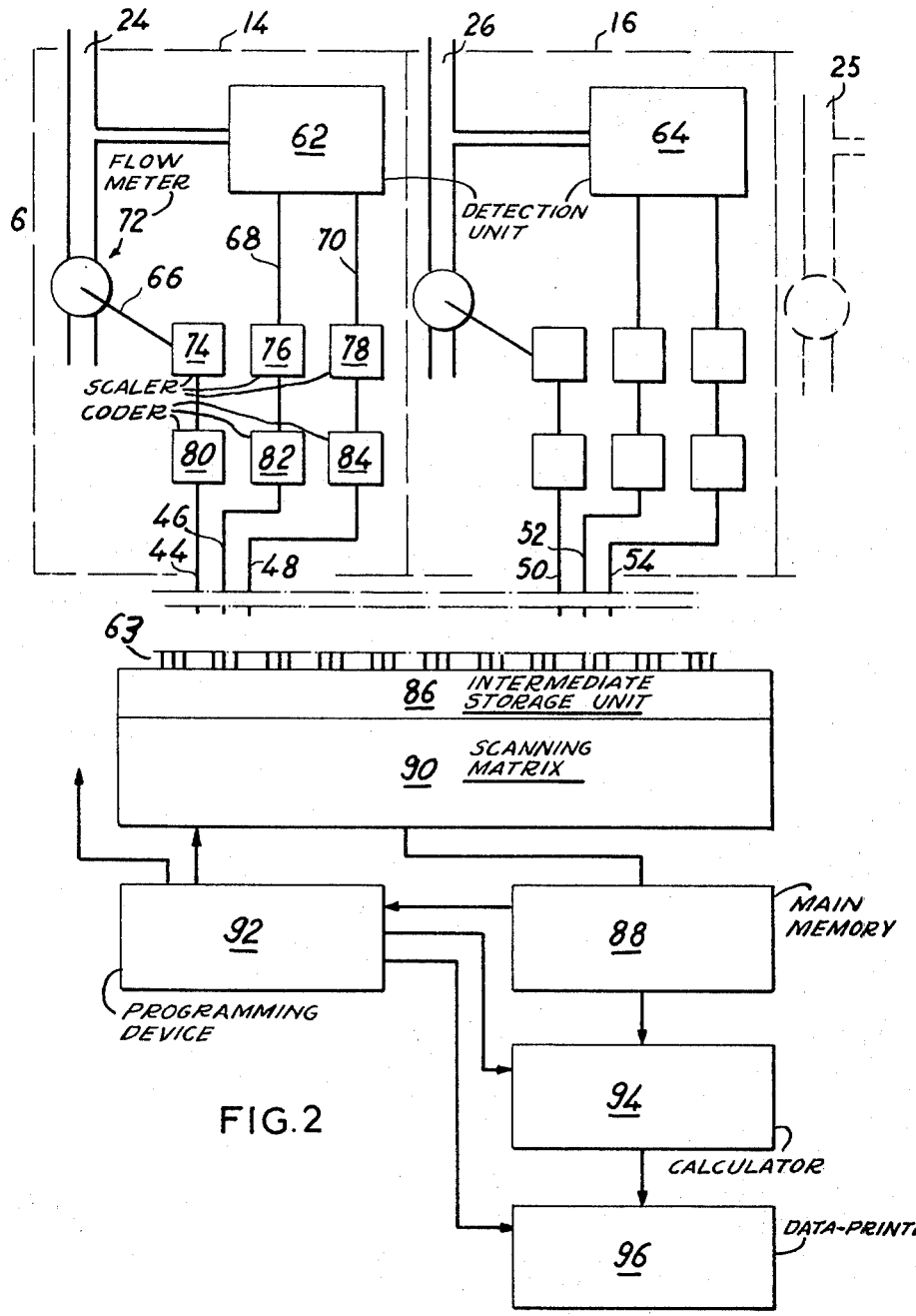
FIG. 2 is a general arrangement diagram of an equipment unit for measuring activity which is discharged in the form of effluents and comprising a computer in accordance with the invention.

The equipment unit of FIG. 2 comprises the measuring device 6, transmission means consisting, for example, of telephone lines 63 as shown in parallel, and a computer 60.

In the case of the equipment unit described, the effluents whose activity it is desired to measure are discharged through a number of conduits although only three of these latter, namely the conduits 24, 26, 25 have been shown in FIG. 2. If the different activities to be measured are of a fairly low order, the detector units 62, 64 must be responsive to small doses.

The principle of the detector which is adopted, and which is described in the patent which has already been cited, is as follows: a known quantity of effluent which is drawn off in such a manner as to constitute a representative sample is subjected to a process of drying by evaporation. The activity of the solid residue which is collected by a stationary filter is measured by means of a photomultiplier scintillator unit.

In order to enhance the accuracy of measurements taken, a second photomultiplier scintillator is mounted in front of an unused, as-manufactured filter of the same type as the first filter. This second unit is designed to measure the background radiation (of cosmic origin, thermodynamic origin, contamination . . . ). By subtracting the number of pulses produced by the second photomultiplier from the number of pulses produced by the first photomultiplier, the accuracy and sensitivity of measurement is improved to an appreciable extent in view of the fact that, in the case of an equipment unit designed by the present applicant, the background radiation results in a series of pulses having a mean repetition frequency of 1.5 c./s. whilst the activity to be detected corresponds to a frequency of 0.1 c./s.

Since the measuring units 62–64 are of identical design, only one unit will therefore be described. Each detector 62 consists of three channels 66, 68, 70 which are assigned respectively to the measurement of the flow rate, the measurement of the total activity of the filter which collects the solid residue produced by drying of a sample of effluents and the measurement of the activity of the unused filter.

The channel 66 comprises a flow meter 72 which is coupled to a scaling device 74, the characteristics of which are so determined that the maximum flow rate corresponds to a series of pulses having a low repetition frequency in the vicinity of 1 c./s., for example.

Each channel 68 and 70 receives from the detector unit 62 series of pulses which measure respectively the sum of the real activity and of the spurious activity which constitutes background radiation, as well as the said spurious activity. These series of pulses are applied to scalers or scaling circuits 76 and 78. In accordance with a preferred form of embodiment, each scaler is constituted by a separator, a scale of ten circuit and a monostable multivibator.

The scalers 74, 76 and 78 are coupled to the coding devices 80, 82 and 84 which serve to transform the incident signals into signals which can be transmitted by telephone lines 44, 46 and 48.

The three telephone lines 44, 46 and 48 transmit over a period of one hour prior to the measurement operation the information which corresponds respectively to the integrated flow rate Q, to the sum of the activity of the filter which has collected the solid residue of effluent and of the background radiation as measured by a number $(S+B)$ which is proportional to the number of pulses produced by the measuring photomultiplier during the period of one hour which precedes the measuring operation, and to the said background radiation as measured by a number B which is proportional to the number of pulses produced by the reference photomultiplier.

Given that $a$ is the activity which has already been discharged during the preceding hours and that K is the coefficient of conversion into millicuries, the total activity which is discharged from the conduit of the order $j$ after the $(n-1)$ hour of monitoring, being $A_{j,n}$, is given by the expression:

$$A_{j,n} = A_{j(n-1)} + K[(S+B)_{j,n} - B_{j,n}]Q_n$$

The function of the computer 6 is to carry out the operations which this expression entails throughout the $p$ conduits and also to calculate the sum $$\sum_{j=1}^{n} A_{j,n}$$

The telephone lines 44, 46, 48, 50, 52, 54 . . . which transmit the information supplied by each measuring device 62, 64 . . . are coupled to the inputs as arranged in groups of three, of the intermediate storage unit 86. The essential element of each channel of this storage unit is a bistable multivibrator. The information which is stored in the intermediate storage unit is transferred to the main storage unit 88 through the intermediary of the scanner 90. The said scanner mainly consists of a matrix system controlled by an address generator which forms part of the programming device 92 and which is synchronized by the storage unit 88. The said storage unit 88 transmits the information which is recorded to the computer system 94 of known type which is also controlled by the programming device. The results produced by the said computer system 94 are transmitted to an output unit 96 which is constituted, for example, by a printing device. The output unit is controlled by the programming device which also controls the detectors.

It should be noted that the results extracted by the output unit are printed on a tabulator. These results relate to the following values in respect of all piping systems:

$B_{jn}$, $(S+B)_{jn}$, $S_{jn}$, $Q_{jn}$, $S_{jn}$, $Q_{jn}$, $A_{jn} =$ $$A_{jn-1} + KS_{jn}Q_{jn} \text{ and also } \sum_{j=1}^{p}$$

in the case of an equipment unit for measuring the activity which is discharged in the form of effluents.

Figure 3:
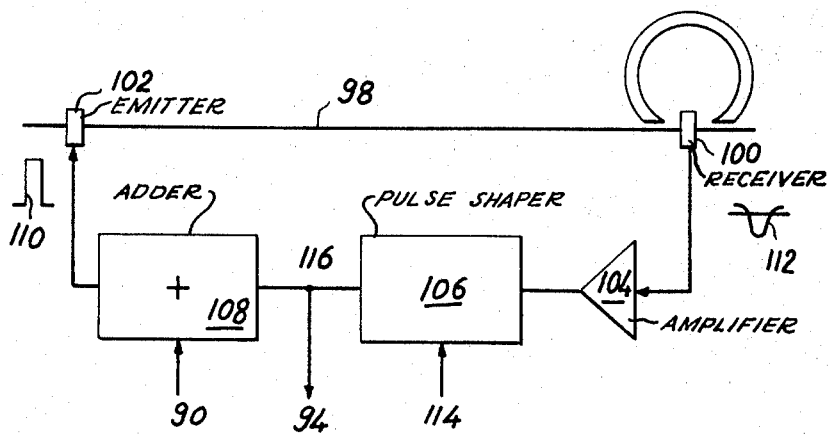
FIG. 3 represents a preferred form of embodiment of a main storage unit which forms part of the computer of FIG. 1.

In the case of a measuring equipment unit designed by the present applicant, the parameters Q, S, $S+B$ must be represented by means of signals which are spaced at intervals of the order of ten ms. In this case, use is preferably made of the main storage unit which is illustrated in FIG. 3 and the essential element of which is a magnetostriction line 98. The advantage of the said magnetostriction line lies in the simplicity of the device, the access time of which is long but nevertheless permitted in this case. The receiver 100 and the emitter 102 are coupled together through an amplifier 104, a re-shaping device 106 and an adder 108 which are associated in series. The storage which is thus provided is a circulating system.

The deformations of the pulses 112 picked up by the receiver 100 compared with the shapes of the pulses 110 which are applied to the emitter show the usefulness of the device 106 which corrects the amplitude and the phase of the pulses transmitted, the second correcting operation being controlled by a crystal oscillator 114 which has not been shown in the drawings. The adder 108 receives from the scanner 90 the signals to be introduced into the line. The signals are taken at 116 so as to be directed to the computer system 94 via a switching unit which has not been shown in the drawings and which serves to introduce the information in a parallel-access device.

A unit such as that which is shown in FIG. 1 has been built by the present applicant. The activities which were stored in the form of effluents contained in the deactivation tanks 18, 20, 22 which were twenty in number were associated with measuring devices 8, 10, 12 . . . which transmit (a) an analog signal representing the volume of effluent which is stored and (b) position-modulated pulses and in continuous manner, so as to represent the specific activity which is an indeterminate quantity.

The activities which were discharged in the form of effluents through the conduits 24, 26 . . . which were ten in number were associated with measuring instruments 14, 16. The said measuring instruments are designed to transmit a signal which measures the flow rate and the amplitude of which can vary from 1 to 9 in one hour. It should be noted that the measured flow rate must be stored prior to being utilized after drying of the samples. The measuring devices additionally supply signals of random amplitude for the purpose of measuring alpha activity, beta activity and the movement proper.

What we claim is:

1. A system for measuring the total radiation confined in a group of effluent deactivation storage tanks comprising, first meter means connected to each tank in said group for measuring the flow of effluent material into said tanks during a predetermined time interval and producing a first electrical signal proportional to said flow rate, first radiation detector means connected to each tank in said group for measuring the instantaneous level of radioactivity of the effluent material flowing into said tanks and producing a second electrical signal proportional to the level of said radiation, second meter means connected to each of a series of conduits through which effluent is drained from said tanks for measuring the flow of effluent material out of said tanks during the predetermined time interval and producing a third electrical signal proportional to said flow rate, second radiation detector means connected to each conduit of said series for measuring the instantaneous level of radioactivity of the effluent material flowing out of said tanks and producing a fourth electrical signal proportional to the level of said radiation, third radiation detector means connected to each conduit of said series for measuring the background radiation associated with said conduit and producing a fifth electrical signal proportional to the level of said background radiation, intermediate electrical pulse storage means having a plurality of inputs, transmission line means for supplying each of said electrical signals to a separate one of the inputs of said intermediate storage means whereby information represented by said electrical signals is temporarily stored, main storage means, programming means for supplying an electrical control signal, a scanning matrix connected between said main storage means and said intermediate storage means, actuated by said electrical control signal, for sequentially scanning the inputs of said intermediate storage means and transferring information stored therein to said main storage means, calculator means, adapted to receive information from said main storage means in response to said electrical control signal, for computing the total radioactivity of the effluent flowing into said tanks during the predetermined time interval as well as the total radioactivity of the effluent material flowing out of said tanks during said predetermined time interval, and data-printing means connected to said calculator means for printing the calculated value of total radioactivity.

2. A system as described in claim 1 wherein said main storage means comprises a circulating memory including a magnetostrictive line, adder means for receiving information to be stored from the scanning matrix, emitter means connected between said adder means and said magnetostrictive line for applying information to said line, receiving means for detecting information recorded on said line, amplifier means connected to an output of said receiver means, pulse shaping means connected to an output of said amplifier means, and output circuit means connecting said pulse shaping means to said adder means and to the calculator means.

References Cited

UNITED STATES PATENTS

| | | | |
|---|---|---|---|
| 2,881,325 | 4/1959 | Hendee et al. | 250—83.6 X |
| 2,957,989 | 10/1960 | Hull | 250—106 X |
| 3,084,254 | 4/1963 | Goupil et al. | 250—83.6 |
| 3,109,929 | 11/1963 | Picard | 250—83.6 X |

ARCHIE R. BORCHELT, *Primary Examiner.*